O. N. KELLY.
COLLAR FASTENER OR CLASP.
APPLICATION FILED AUG. 9, 1920.
1,382,514.
Patented June 21, 1921.
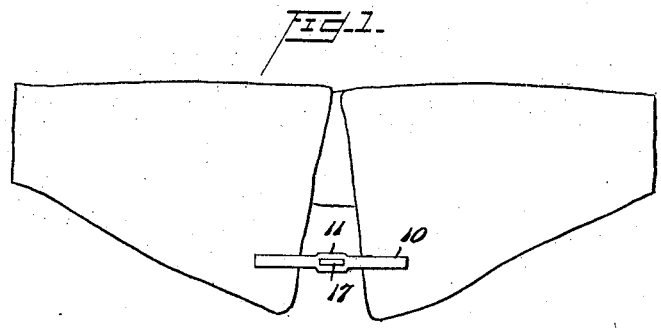
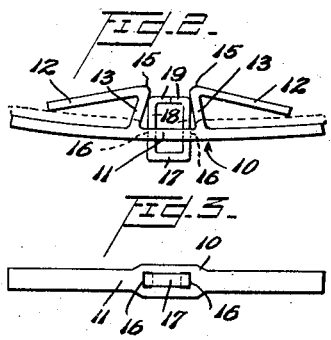
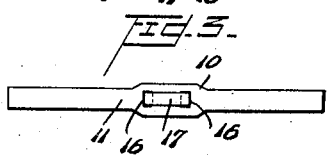
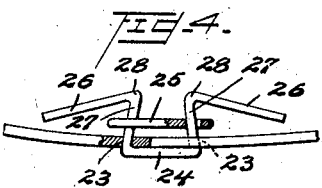
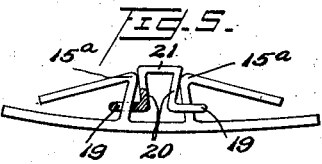
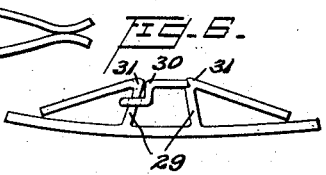
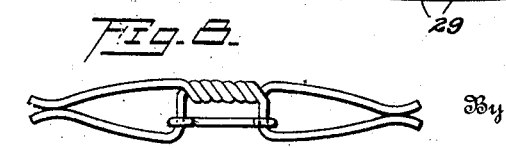

UNITED STATES PATENT OFFICE.

ORSON N. KELLY, OF DALLAS, TEXAS.

COLLAR FASTENER OR CLASP.

1,382,514.     Specification of Letters Patent.     Patented June 21, 1921.

Application filed August 9, 1920. Serial No. 402,462.

*To all whom it may concern:*

Be it known that I, ORSON N. KELLY, a citizen of the United States, residing at Dallas, in the county of Dallas and State of Texas, have invented certain new and useful Improvements in Collar Fasteners or Clasps, of which the following is a specification.

This invention has relation to collar fasteners, and more particularly to such a fastener which will grip and hold in proper position the flaps of a soft collar to insure a neat appearance thereof while in use.

It has for its object the provision of a collar fastener, which will hold the flaps of a collar properly spaced from each other and give to the collar flaps the proper curvature. It has for a further object the secure gripping of the flaps of the collar by the fastener to the end that no untidy appearance will occur. A further object is to provide such a fastener, which will be neat in appearance, and in which the gripping means will be hidden from view, or present a neat appearance if in view. A further object of the invention is to provide a fastener which may be used upon relatively thick collars and which will clamp efficiently thereafter the flaps of collars made of relatively thin or delicate material. A still further object of the invention is the provision of a fastener of this type, which will permit an easy engagement of the collar flaps and provide a secure clamping means therefor.

Other objects and advantages of the invention will hereinafter appear in the following description and the novel features thereof will be particularly pointed out in the appended claims.

In the drawings,

Figure 1 is a view of my fastener as applied to a collar,

Fig. 2 is a top plan view of my fastener,

Fig. 3 is a front view thereof,

Figs. 4, 5 and 6 are views similar to Fig. 2 showing modified forms of the invention, and Figs. 7 and 8 show further modifications in which the parts are made of wire, Fig. 8 illustrating an alternative manner of uniting the wire members.

Like letters of reference indicate like parts throughout the several figures of the drawings.

The numeral 10 represents the collar fastener as a whole, which consists of a body portion 11, made comparatively stiff, and a pair of gripping members 12, 12, connected to said body portion by means of supporting members 13, 13 inwardly converging and forming with the gripping members 12 the elbows 15, 15.

All of these parts, as shown in Fig. 1, are made from a single blank of material by slitting the same longitudinally from each end thereof for a portion of its length and bending one portion of the slitted blank to form the members 12 and 13, or they may be all stamped from a single piece of metal.

The body portion is provided with a pair of openings 16, 16, through which are passed the legs 18, 18 of a sliding lock or wedge 17, said legs after passage through the openings 16, 16, being bent at right angle to form abutting ends to give rigidity to the said sliding lock or wedge. The right angle bends of the legs 18 constitute the abutting portions of the lock which ride upon the inclined supporting members 13 and force said members toward a vertical position when the clamping jaws 12 will be brought into gripping contact with the rear face of the body portion 11 to hold the collar flaps. In this form of the invention the sliding lock member is pressed into locked position from the front of the fastener by hand pressure upon the bar connecting the legs 18. 18. It is released by pressure from the rear of the fastener upon the ends 19, 19.

Any suitable ornamental design may be placed upon the body 11 to add to the neat appearance of the fastener when being worn.

In the form shown in Fig. 4, the curved base member is provided with apertures 23, through which the U-bar 24 is passed. The legs of this bar are also passed through the sliding lock 25 consisting of a flat metal member provided with the necessary apertures. The said legs are subsequently bent to form the gripping arms 26. The U-bar is soldered or otherwise secured to the face of the body portion. The sliding lock or wedge 25 is moved upon the converging supporting members 27 which may be suitably roughened for the purpose so as to force them apart at the elbows 28 to apply gripping action upon the collar flaps; to release the said gripping action the reverse of this movement is all that is necessary.

In Fig. 5 a form of the invention is shown in which the sliding lock or wedge is modified. The body, supporting arms and gripping elements are formed in the same manner as in the form of Fig. 1, but before the elbows 15ª are formed the legs in which they are formed are passed through apertured feet 19, 19, of the sliding lock or wedge. The said feet are attached to the converging leg portions 20, 20, of the sliding lock, which in turn are connected by the bar 21. The inclined leg portions 20 coact with the supporting members to force the gripping elements into contact with the under surface of the body portion. In this form of the invention, the lock is applied and released from the rear of the fastener by proper finger manipulation.

In the form shown in Fig. 6 a lock or wedge of the pivoted type is used, which is mounted upon one of the supporting members 29 and bent to form a shoulder 30 which lies in contact with the elbow 31 of the member 29. The free end of the lock is brought into contact with the elbow of the other supporting member 29 for the purpose of spreading the said supporting members apart to apply gripping pressure upon the collar flaps.

While I have shown and described my invention in connection with a fastener for the flaps of soft collars, it may be nevertheless used to fasten other objects, as for instance, shirt sleeves or other articles of dress or wearing apparel.

While I have shown my fastener as made of material in strip form, the parts thereof may be made of wire. For instance, the form of Fig. 4 may consist of a wire body and a wire clamping member, secured together by twisting the two members about each other or one about the other and subsequently bending the wire to form the converging supporting arms, upon which may be mounted a wedge member in the form of a link with eyes at the ends encircling the supporting members. The ends of the wires forming the two members of the fastener may be looped to form broad clamping surfaces.

It will be seen that a neat and efficient collar fastener is provided by my invention for the adaptation shown, and one by which the collar flaps will be held securely and in proper space relation.

It is understood that variations may be made in the shape or form of the invention for ornamental purposes, and I reserve the privilege of resorting to all the mechanical changes to which the device is susceptible, the invention being defined and limited only by the appended claims. In all forms of the invention, the inner surface of the end portions of the body are preferably roughened to more securely hold the collar flaps.

Having described my invention what I claim as new and desire to secure by Letters Patent is:

1. A collar fastener comprising a body portion, converging supporting members projecting therefrom, gripping arms mounted upon said supporting members and cooperating with the ends of the body portion, and means for spreading said converging supporting members to apply gripping contact between the gripping arms and the body portion.

2. A collar fastener comprising a body portion, converging supporting members projecting therefrom, gripping arms mounted upon said supporting members and cooperating with the ends of the body portion, and a wedge member for spreading the supporting arms to apply gripping contact between the gripping arms and the body portion.

3. A collar fastener comprising a body portion or bar slitted for a portion of its length to form an integral member which is bent to form an outstanding supporting member which in turn is bent to form a gripping arm to coact with the body portion to engage the flap of a collar.

4. In a fastener or clasp, a body portion provided with apertures, a U-bar passed through said apertures and bent to form supporting members and gripping arms cooperating with said body portion, and means for spreading said gripping arms to apply clamping pressure to said gripping arms.

5. In a fastener, the combination of a body portion provided with apertures, converging supporting members projecting therefrom, gripping arms carried by said supporting members, and a sliding lock or wedge mounted in the apertures of said body portion and adapted to spread said converging supporting members to place the gripping arms in clamping relation with the face of the body portion.

6. A collar fastener comprising a body portion or bar, and gripping arms diverging therefrom, said arms being bent toward the ends of the body portion, and means for forcing the elbows of said arms apart to securely clamp the ends of said arms against the ends of the body portion.

7. A collar fastener comprising a bar and two resilient members converging therefrom, said resilient members being elbowed toward the end portions of the bar, and means adapted to abut against the converging portions of the resilient members to force the ends of same against the ends of the bar for gripping therebetween the flaps of a collar.

In testimony whereof I affix my signature.

ORSON N. KELLY.